United States Patent
Dusang, Jr. et al.

(10) Patent No.: US 8,072,715 B2
(45) Date of Patent: Dec. 6, 2011

(54) METHOD, APPARATUS AND COMPUTER PROGRAM PRODUCT FOR FAULT PROTECTION

(75) Inventors: Louis V. Dusang, Jr., Biloxi, MS (US); Jeffrey B. Roberts, Ammon, ID (US)

(73) Assignee: Huntington Ingalls Incorporated, Newport News, VA (US)

( * ) Notice: Subject to any disclaimer, the term of this patent is extended or adjusted under 35 U.S.C. 154(b) by 673 days.

(21) Appl. No.: 12/245,180

(22) Filed: Oct. 3, 2008

(65) Prior Publication Data
US 2010/0014198 A1    Jan. 21, 2010

Related U.S. Application Data

(60) Provisional application No. 61/081,196, filed on Jul. 16, 2008.

(51) Int. Cl.
*H02H 3/00* (2006.01)
*H02H 9/08* (2006.01)

(52) U.S. Cl. .......................... 361/42; 361/47
(58) Field of Classification Search ............... 361/42, 361/47
See application file for complete search history.

(56) References Cited

U.S. PATENT DOCUMENTS

| | | |
|---|---|---|
| 3,754,221 A | 8/1973 | Stelter |
| 3,840,783 A | 10/1974 | Eckart |
| 3,978,400 A | 8/1976 | Pettit |
| 4,706,156 A | 11/1987 | Caunce |
| 4,725,914 A | 2/1988 | Garitty |
| 5,390,067 A | 2/1995 | Eriksson et al. |
| 5,515,227 A | 5/1996 | Roberts et al. |
| 5,537,283 A * | 7/1996 | Keese ............................ 361/42 |
| 5,537,327 A | 7/1996 | Snow et al. |
| 5,602,709 A | 2/1997 | Al-Dabbagh |
| 5,694,281 A | 12/1997 | Roberts et al. |
| 5,946,174 A | 8/1999 | Kaiser |
| 6,249,230 B1 | 6/2001 | Baldwin et al. |
| 6,396,279 B1 | 5/2002 | Gruenert |
| 6,442,010 B1 | 8/2002 | Kasztenny et al. |
| 6,560,132 B1 | 5/2003 | Roberts |
| 6,573,726 B1 | 6/2003 | Roberts et al. |
| 6,590,397 B2 | 7/2003 | Roberts |
| 6,721,671 B2 | 4/2004 | Roberts |
| 6,785,105 B2 | 8/2004 | Roberts et al. |
| 6,829,544 B1 | 12/2004 | Kasztenny et al. |
| 6,888,708 B2 | 5/2005 | Brungs et al. |
| 7,069,116 B2 | 6/2006 | Kunsman et al. |
| 7,180,300 B2 | 2/2007 | Premerlani et al. |
| 7,180,717 B2 | 2/2007 | Kojovic et al. |
| 7,529,069 B1 * | 5/2009 | Weems et al. ................. 361/42 |
| 7,894,169 B2 * | 2/2011 | Valdez et al. ................. 361/47 |

* cited by examiner

*Primary Examiner* — Dharti Patel
(74) *Attorney, Agent, or Firm* — Hunton & Williams LLP

(57) ABSTRACT

An apparatus is provided for fault protection. The apparatus may include one or more electronic components configured to receive a single phase-to-ground fault signal and a double phase-to-ground fault signal subsequent to receiving the single phase-to-ground fault signal. The one or more electronic components may be further configured to provide for a delay while the single phase-to-ground fault signal indicates that a single phase-to-ground fault is present on the ungrounded power system and the double phase-to-ground fault signal indicates that the double phase-to-ground fault is present on the ungrounded power system. The delay may allow for an opportunity to isolate a phase-to-ground fault on a first phase from a phase-to-ground fault on a second phase. Associated methods and computer program products are also provided.

20 Claims, 10 Drawing Sheets

METHOD, APPARATUS AND COMPUTER PROGRAM PRODUCT FOR FAULT PROTECTION

CROSS REFERENCE TO RELATED APPLICATIONS

The present application claims priority to U.S. Provisional Application No. 61/081,196 filed Jul. 16, 2008 the contents of which are incorporated by reference herein in their entirety.

TECHNICAL FIELD

Embodiments of the present invention relate generally to protecting power systems against fault conditions and, more particularly, relate to an apparatus, method, and a computer program product for fault protection.

BACKGROUND

For many commercial, industrial, and even residential environments, power system reliability is of utmost importance. In some manufacturing or textile environments, a power outage can result in the loss of substantial quantities of product that were in the production process when the outage occurred. Further, power outages can result in down time for a facility, not only during the outage, but also due to production restarting procedures that must be undertaken subsequent to an outage. Losses of product and down time can also lead to substantial monetary losses for a facility as a result of the power outage. As such, facilities often take measures to improve or maximize power system reliability to avoid such losses.

One manner of improving power system reliability is to utilize an ungrounded power system. An advantage of an ungrounded power system is its ability to "ride-through" single phase-to-ground faults. In this regard, ungrounded systems have no intentional ground connections. As a result, when a single phase-to-ground fault occurs on an ungrounded power system, the voltage phasor triangle between the phases remains intact. Therefore, loads can remain in service while the system is experiencing the fault. FIG. 1 depicts the shift in the neutral point of an ungrounded power system experiencing a single phase-to-ground fault. In FIG. 1, the system is experiencing a phase-to-ground fault on A phase.

While ungrounded systems enjoy the benefit of riding-through single phase-to-ground faults, ungrounded systems also have drawbacks. For instance, the single phase-to-ground fault ride-through capability also places voltage stresses on the ungrounded system. Additionally, since fault currents on ungrounded systems can often have magnitudes similar to that of load current, locating a fault can also be problematic.

System protective devices, such as protective relays, may monitor system voltages and if voltage stresses are detected, the protective devices may determine that a fault is present on the system. Further, conventional solutions for locating a single phase-to-ground fault on an ungrounded system may include isolating individual bus-tie feeders and monitoring the phase voltages during the isolations. A variation of the phase voltages, such as the zero-sequence voltage, such that the voltages return to pre-fault levels may indicate the location of the fault. In radial systems, such an isolation procedure can be performed quickly, such that equipment may not be effected by the brief outage. Also, since fault current may flow in many directions relative to various sources on the system, many protective devices include a directional element for assisting in determining the location of the fault. Further, other solutions for determining the location of a phase-to-ground fault include monitoring the zero-sequence currents.

As described above, an ungrounded power system can remain operational while experiencing a single phase-to-ground fault. However, there are circumstances where conventional protective relays de-energize a large portion of a distribution system when a second, single phase-to-ground fault occurs on another phase. The existence of such a condition on the power system is a phase-to-phase-to-ground fault or a double phase-to-ground fault. Ungrounded systems may not operate properly when a double phase-to-ground fault is present on the system because two phases are electrically connected, collapsing the voltage phasor triangle. Therefore, no ride-through capability is available for double phase-to-ground faults. In these situations, differential current protection devices send trip signals to breakers across the affected zones of the power system de-energizing these zones as a means of protecting the system.

For example, consider the radial multi-source system of FIG. 2a and the ring bus configuration of FIG. 2b. Generator 1 provides a first source and generator 2 provides a second source to the power systems of FIGS. 2a and 2b. At the occurrence of a first phase-to-ground fault on A phase between buses 1 and 2, continued power service is provided due to the systems being ungrounded power systems with a single phase-to-ground fault. The A phase-to-ground fault alone on the feeder between bus 1 and bus 2 will not result in the tripping (i.e., opening) of circuit breakers on the ungrounded power systems. The same would be true if a single B phase-to-ground fault occurred between buses 3 and 4, in the absence of the depicted A phase-to-ground fault.

However, if the B phase-to-ground occurs before the A phase-to-ground fault is cleared, (i.e., isolated or repaired) a double phase-to-ground fault is detected on the system. Protective devices immediately react to isolate the faulted zones from the system. For the dual-source configuration shown in FIG. 2a, the relays associated with the feeders between bus 1 and bus 2, bus 2 and bus 3, and bus 3 and bus 4 will send trip signals to their respective breakers resulting in a differential element trip for a phase-to-phase fault or a double phase-to-ground fault. As a result, power transformers associated with bus 2 and bus 3 will have no power source.

A similar result occurs for the ring bus system of FIG. 2b, however, a protective device "racing" condition may occur due to the ring bus configuration where many protective devices may attempt to react. In the ring bus configuration case, it is possible that more of the system may be shutdown, i.e., it is possible that, in addition to the protective devices associated with the feeders between buses 1 to 2, 2 to 3, and 3 to 4 sending a trip signal to their associated breakers, the protective devices associated with the feeder between buses 4 and G2 may also send a trip signal to their respective breakers. As a result, the power transformers associated with bus 2 and bus 3 will have no power source. Additionally, in some instances, bus 4 may not have a power source and bus G2 may be taken offline.

Under conventional relaying schemes, both configurations are left with substantial portions of the systems with no power source. Accordingly, it would be desirable to develop and implement apparatuses and/or relaying schemes that provide system protection in these and other situations in a manner that maintains service to the entire system or maximizes service to the equipment on the system. In particular, it would be desirable to develop and implement apparatuses and/or relaying schemes that would provide service to the all the power transformers when two, single phase-to-ground faults occur simultaneously at different locations on a system.

BRIEF SUMMARY

A method, apparatus, and computer program product are therefore provided that address at least some of the needs described above by providing for fault protection. Generally in this regard, conventional protective devices may not be able to distinguish between two, single phase-to-ground faults at separate locations and on different phases on an ungrounded power system, and a double phase-to-ground fault at a single location. However, exemplary embodiments of the present invention may detect a first, single phase-to-ground fault and introduce a delay period when a second, single phase-to-ground fault occurs (i.e., a double phase-to-ground fault), rather than immediately force isolation of a potentially large portion of the power system between the two separate faults. This delay may permit a supervisory system to intelligently open switching devices such that maximum load may remain online. In the event that the supervisory system does not respond within a predetermined duration, the delay period may expire, and trip signals may be provided to the appropriate switching devices to isolate the faulted zones of the power system.

In this regard, in one exemplary embodiment of the present invention, a method of fault protection is provided. The exemplary method may include receiving a single phase-to-ground fault signal, the single phase-to-ground fault signal indicating that a first phase-to-ground fault is present on a first phase of an ungrounded power system. The exemplary method may also include receiving a double phase-to-ground fault signal subsequent to receiving the single phase-to-ground fault signal, the double phase-to-ground fault signal indicating that a double phase-to-ground fault is present on the ungrounded power system due to the first phase-to-ground fault on the first phase and a second phase-to-ground fault on a second phase. Further, the exemplary method may include providing for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system. In this regard, the delay may allow for an opportunity to isolate the phase-to-ground fault on the first phase from the phase-to-ground fault on the second phase prior to expiration of the delay.

In another exemplary embodiment, an apparatus for providing fault protection is described. The exemplary apparatus may comprise a plurality of electronic components. The plurality of electronic components may be configured to receive a single phase-to-ground fault signal. The single phase-to-ground fault signal may indicate that a first phase-to-ground fault is present on a first phase of an ungrounded power system. The plurality of electronic components may also be configured to receive a double phase-to-ground fault signal subsequent to receiving the single phase-to-ground fault signal, the double phase-to-ground fault signal indicating that a double phase-to-ground fault is present on the ungrounded power system due to the first phase-to-ground fault on the first phase and a second phase-to-ground fault on a second phase. Further, the plurality of electronic components may be configured to provide for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system. In this regard, the delay may allow for an opportunity to isolate the phase-to-ground fault on the first phase from the phase-to-ground fault on the second phase prior to expiration of the delay.

In yet another exemplary embodiment, a computer program product for fault protection is provided. The computer program product comprising at least one computer-readable storage medium having executable computer-readable program code portions stored therein. The computer-readable program code portions may include first, second, and third program code portions. The first program code portion may be configured to receive a single phase-to-ground fault signal, the single phase-to-ground fault signal indicating that a first phase-to-ground fault is present on a first phase of an ungrounded power system. The second program code portion may be configured to receive a double phase-to-ground fault signal subsequent to receiving the single phase-to-ground fault signal, the double phase-to-ground fault signal indicating that a double phase-to-ground fault is present on the ungrounded power system due to the first phase-to-ground fault on the first phase and a second phase-to-ground fault on a second phase. The third program code portion may be configured to provide for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system. In this regard, the delay may allow for an opportunity to isolate the phase-to-ground fault on the first phase from the phase-to-ground fault on the second phase prior to expiration of the delay.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
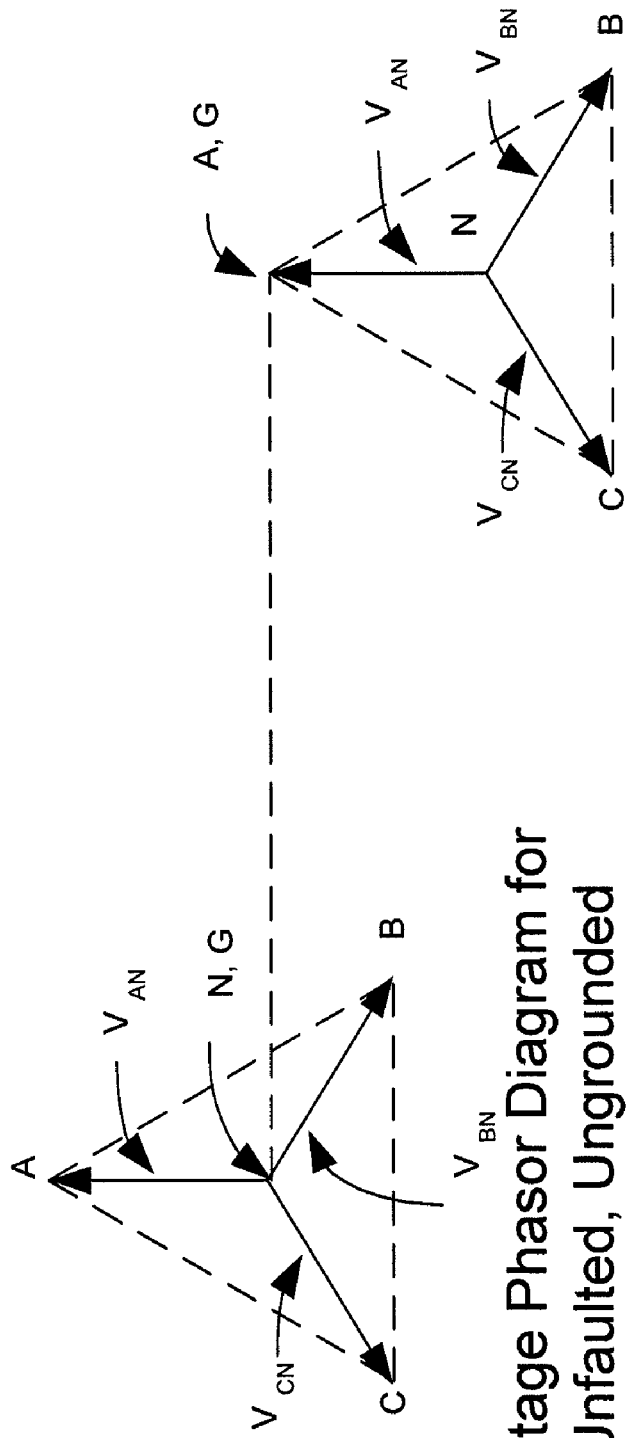
FIG. 1 is an illustration of voltage phasor diagrams before and after an exemplary single phase-to-ground fault on an ungrounded power system.
Figure 2A:
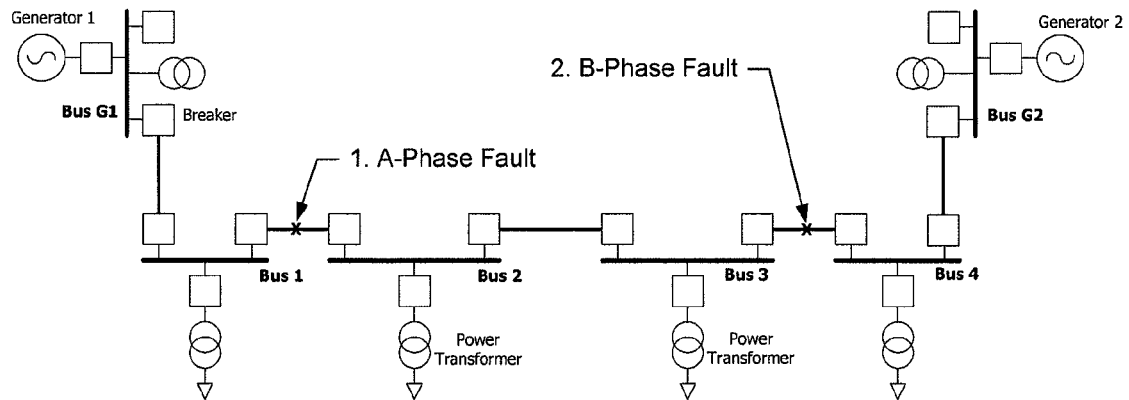
FIG. 2a illustrates a radial multi-source configuration of an ungrounded power system experiencing a double phase-to-ground fault.
Figure 2B:
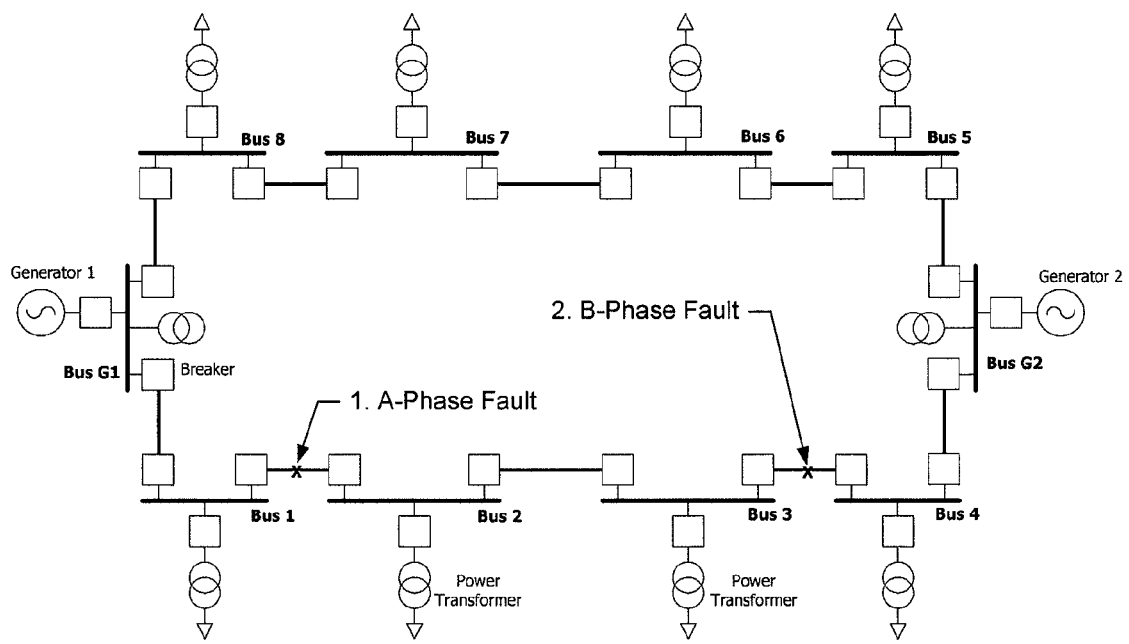
FIG. 2b illustrates a ring bus configuration of an ungrounded power system experiencing a double phase-to-ground fault.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Further, the term "exemplary" as used herein is defined to indicate an example, and should not be construed to indicate a qualitative assessment.

Figure 3:
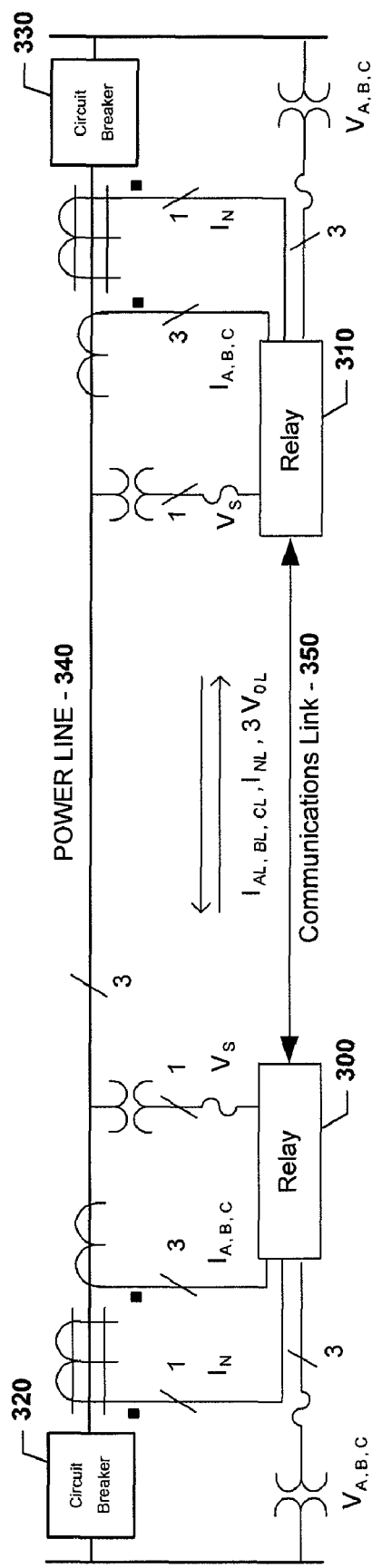
FIG. 3 illustrates a relay device configuration for protecting a power system according to various exemplary embodiments of the present invention.

FIG. 3 depicts a relaying configuration for protecting a power system that may be utilized in the implementation of various embodiments of the present invention. The configuration includes two protective relays 300 and 310 at either end of a power line 340. The protective relays may monitor the voltages and currents on the power line 340 and on buses associated with the protective relays. In various exemplary embodiments, voltage transformers and current transformers may be used to monitor the voltages and currents. The protective relays 300 and 310 may also control a switching device, such a circuit breaker, a circuit switcher, a recloser, a solid-state switching device, an automated switch, other switching devices, other protective devices (e.g., fuses), or the like. In the exemplary embodiment of FIG. 3, protective relays 300 and 310 control circuit breakers 320 and 330, respectively. In this regard, based on the monitored currents and voltages, the protective relays may determine that an event has occurred on the power system (e.g., a fault, an under or over frequency condition, or the like) and react to the event by controlling the switching device.

In the configuration of FIG. 3, the protective relays may communicate with each other via the communication link 350. The communication link 350 may be a portion of a Supervisory Control And Data Acquisition (SCADA) system, which may be implemented using fiber optic connections between devices. As such, via the communication link 350, protective relays 300 and 310 can cooperatively operate to isolate, for example, a fault on the power line 340 by transmitting a trip signal to the circuit breakers 320 and 330, causing the circuit breakers 320 and 330 to open.

In the exemplary configuration of FIG. 3, the power line 340 may be representative of a local zone to the protective relays 300 and 310. In this regard, a fault that occurs on the power line 340 may be considered a local fault to the protective relays 300 and 310 because the protective relays, unilaterally or cooperatively, may control one or more switching devices to isolate the fault from the remainder of the power system. Accordingly, faults occurring on the system at locations other than on the power line 340 may be considered remote faults. In this regard, the protective relays 300 and 310 may detect a remote fault, but may not have control over the switching devices needed to isolate the fault.

With respect to the protective relays monitoring functionality, protective relays often use a differential scheme for protecting a zone (e.g., power line 340) of a power system. In this regard, the relays associated with the zone may monitor the current entering the zone and the current leaving the zone. If the current entering the zone is not equal to the current leaving the zone, then a fault in the zone has likely occurred. Currents entering and leaving have a differential value because some portion of the current is being diverted to the fault. In some exemplary embodiments, the current differential must exceed a predetermined value (i.e., a pick-up value) before a fault condition is identified by the protective relays.

Protective relays may also include directional such as overcurrent or power elements for protection. In this regard, the relays may include non-directional elements in conjunction with a directional function. Directional elements may provide sensitive tripping for fault currents in a forward direction, but not in a reverse direction. Further, directional elements may be another means of comparing the current flow at the terminals where the relays are located. When current flows into the line at the relay, an internal fault may be detected, and the relay may send a trip signal to the circuit breaker. When current flows out from the relay, an external fault may be detected and a blocking signal may prevent a trip signal from being sent to the breakers, since it is likely that other relays and associated breakers on the system can isolate the fault.

Additionally, protective relays may also include ground fault protection. Ground fault protection is typically based on two methods: one based on voltage measurements and the other based on current measurements. Voltage measurements can accurately detect ground faults, but are not very effective in locating the ground fault. In this regard, on an ungrounded system, when a single phase-to-ground fault occurs all phase voltages can shift, as depicted in FIG. 1. Such a shift in the monitored voltages may indicate the presence of a fault on the power system. However, such a shift in the voltages does not lend to ready detection of the location of the phase-to-ground fault. Rather, in some exemplary embodiments, zero sequence current measurements, in conjunction with directional elements, may be used to locate the ground fault.

Figure 4:
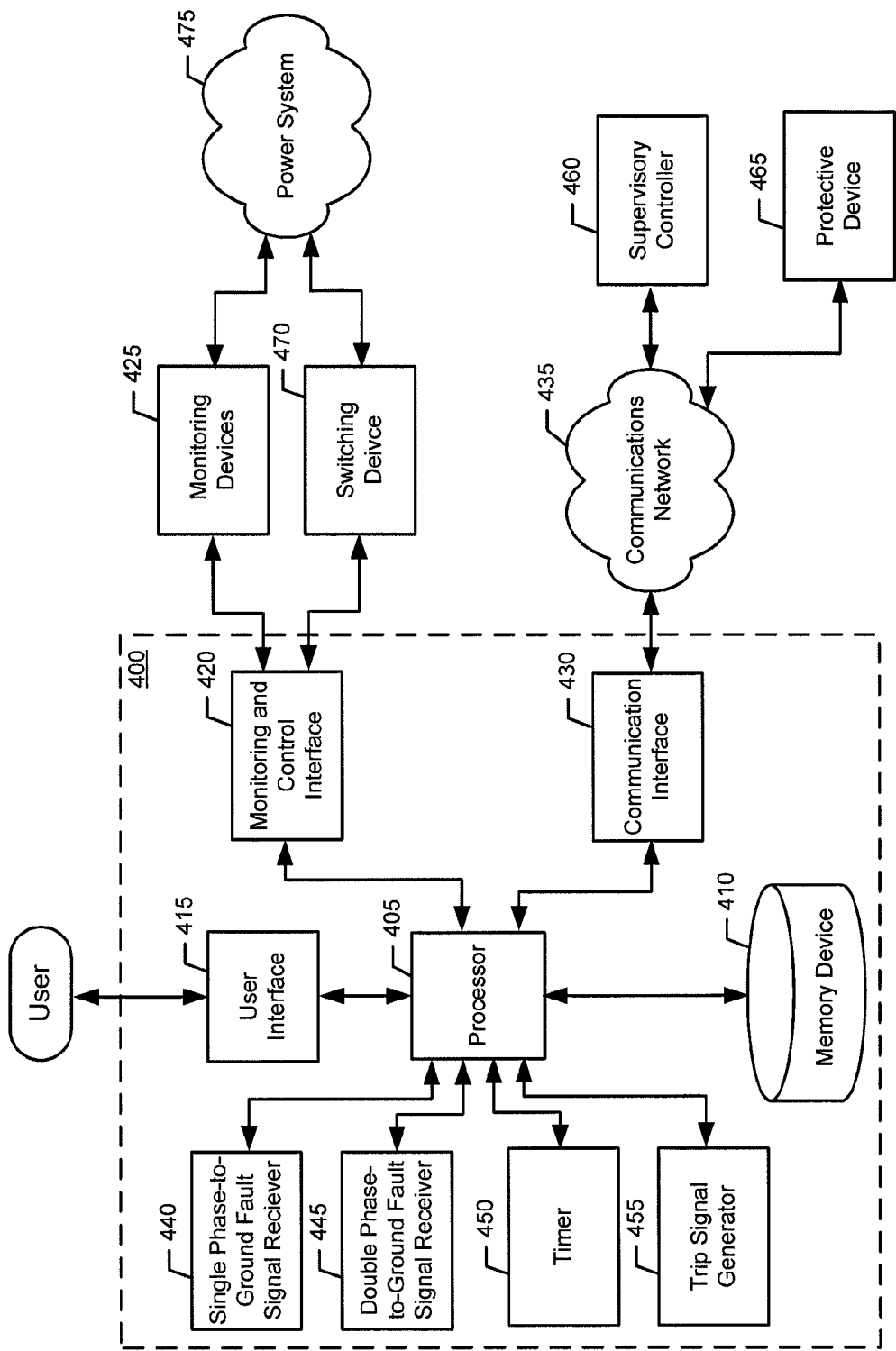
FIG. 4 is a block diagram of a monitoring and controlling system including an apparatus for fault protection according to various exemplary embodiments of the present invention.

FIG. 4 depicts an exemplary apparatus 400 for fault protection according to various exemplary embodiments of the present invention. Apparatus 400 may be embodied as any computing device, such as, a protective relay or a protective relay controller, a computer system, a supervisory controller (e.g., a SCADA server), other power system monitoring and control device, or the like. The apparatus 400 may include or otherwise be in communication with a processor 405, a user interface 415, a communication interface 420, and a memory device 410. The memory device 410 may include, for example, volatile and/or non-volatile memory. The memory device 410 may be configured to store information, data, settings (e.g., pick-up values, calibration values, determined threshold durations, etc.), applications, instructions, or the like for enabling the apparatus 400 to carry out various functions in accordance with exemplary embodiments of the present invention. For example, the memory device 410 could be configured to buffer input data for processing by the processor 405. Additionally or alternatively, the memory device 410 could be configured to store instructions for execution by the processor 405. As yet another alternative, the memory device 410 may be one of a plurality of data stores including, for example, databases, that store information in the form of static and/or dynamic information.

The processor 405 may be embodied in a number of different ways. For example, the processor 405 may be embodied as a microprocessor, a coprocessor, a controller, or various other processing means or elements including a plurality of electronic components (e.g., logic gates and associated circuitry), integrated circuits such as, for example, an ASIC (application specific integrated circuit) or FPGA (field programmable gate array). In an exemplary embodiment, the processor 405 may be configured to execute instructions stored in the memory device 410 or other memory accessible to the processor 405.

The user interface 415 may be in communication with the processor 405 to receive an indication of a user input at the user interface 415 and/or to provide an audible, visual, mechanical, or other output to the user. As such, the user interface 415 may include, for example, a keyboard, a mouse, a joystick, a microphone, a speaker, or other input/output mechanisms. The user interface 415 may also include a display, which may be embodied as a touch screen display, a conventional display, or the like. In some exemplary embodiments, such as ones where the apparatus 400 is a computer system, a protective relay, or a server, the user interface 415 may be remote from the processor 405 and the processor 405 may use, for example, the communication interface 430 and the communication network 435 to communicate with a user.

In some exemplary embodiments, the apparatus 400 may include a communication interface 430 embodied as any device or means embodied in either hardware, software, or a combination of hardware and software that is configured to receive and/or transmit data from/to a network and/or any other device or module in communication with the apparatus 400. In this regard, the communication interface 430 may include, for example, an antenna, a transmitter, a receiver, a transceiver and/or supporting hardware or software for enabling communications with communications network 435, which may be any type of wired or wireless network. In some exemplary embodiments, communications network 435 may be a SCADA network. Various other network entities may be connected to the network 435, and communications may occur between the apparatus 400 and the other network entities via the network 435. In this regard, via the communication interface 430 and the network 435, the apparatus 400 may communicate with the supervisory controller 460, and other protective devices, such as protective device 465.

The supervisory controller 460 may be any type of computing device for storing, retrieving, computing, transmitting, and receiving data. In some embodiments, the supervisory controller 460 may be a SCADA server or other SCADA device that can monitor and control a power system. In this regard, the supervisory controller 460 may communicate with the apparatus 400 to perform fault protection according to various exemplary embodiments. The supervisory controller 460 may include a memory device, a processor, and a communication interface for communicating with the network 435.

The protective device 465 may also be any type of device for storing, retrieving, computing, transmitting, and receiving data. In some embodiments, protective device may be protective relay that may operate in cooperation with apparatus 400 to perform fault protection. Protective device 465 may be located on the power system such that protective device 465 and apparatus 400 monitor and control a common, local zone. In this regard, protective device 465 and apparatus 400 may operate in cooperation to isolate a fault on the local zone from the remainder of the power system. Alternatively, in some embodiments, protective device 465 may be located such that protective device 465 monitors and controls a zone that is remote from apparatus 400.

Apparatus 400 may also include a monitoring and control interface 420. The monitoring and control interface 420 may be embodied as any device or means embodied in either hardware, software, or a combination of hardware and software that is configured to receive and/or transmit data from/to monitoring and controlling devices. For example, monitoring devices 425 may include voltage and current transformers for monitoring voltages and currents on power system 475, and monitoring and control interface 420 may be configured to receive signals for the monitoring devices 425 and communicate the signals or representations of the signals to processor 405 for analysis. Further, monitoring and control interface 420 may also communicate signals from, for example, processor 405, to a switching device 470, in order to act upon the power system 475. For example, monitoring and control interface 420 may be configured to receive a representation of a trip signal from the processor 405 and communicate a trip signal to the switching device 470.

In this regard, switching device 470 may be any type of device capable of receiving a signal and acting upon the signal by performing power system switching (i.e., an opening or closing operation). For example, switching device 470 may be a circuit breaker, a circuit switcher, a recloser, a solid-state switching device, an automated switch, other switching devices, other protective devices (e.g., fuses), or the like.

The power system 475 may be any type of power system, such as, for example a multi-phase power system. In exemplary embodiments, where the power system is a three-phase power system, the loads and/or sources may be connected in a delta or wye configuration. Power system 475 may also be an ungrounded power system or a power system with high impedance grounding. The exemplary embodiments of the present invention are described herein with respect to a three-phase ungrounded power system. However, it is contemplated that aspects of the present invention are also applicable to other system configurations.

Apparatus 400 may also include a single phase-to-ground fault signal receiver 440, a double phase-to-ground fault signal receiver 445, a timer 450, and a trip signal generator 455. The single phase-to-ground fault signal receiver 440, the double phase-to-ground fault signal receiver 445, the timer 450, and the trip signal generator 455 may be any means or device embodied in hardware, software, or a combination of hardware and software that is configured to carry out the functions of the single phase-to-ground fault signal receiver 440, the double phase-to-ground fault signal receiver 445, the timer 450, and the trip signal generator 455, respectively, as described herein. In an exemplary embodiment, the processor 405 may include, or otherwise control the single phase-to-ground fault signal receiver 440, the double phase-to-ground fault signal receiver 445, the timer 450, and the trip signal generator 455.

The single phase-to-ground fault signal receiver 440 may be configured to receive a single phase-to-ground fault signal. In this regard, the apparatus 400 may include various means for receiving the single phase-to-ground fault signal, which may include the processor 405, the single phase-to-ground fault signal receiver 440, the communication interface 430, the monitoring and control interface 420, a plurality of electronic components, the user interface 415, algorithms for receiving the single phase-to-ground fault signal described herein and executed by the foregoing or other elements, and/or the like. The single phase-to-ground fault signal may indicate whether a single phase-to-ground fault is present on the power system.

According to various exemplary embodiments, the single phase-to-ground fault signal may be received as a result of an analysis performed by, for example, the processor 405 on information provided by the monitoring devices 425. As such, the single phase-to-ground fault signal may be received internally as a result of the analysis. Further, the single phase-to-ground fault signal may also be received from the supervisory controller 460. In this regard, another protective device, such as a protective relay, may have detected a single phase-to-ground fault on the power system and communicated the presence of the fault to the supervisory controller 460.

Further, the single phase-to-ground fault signal receiver 440 may be configured to receive the single phase-to-ground fault signal, where the single phase-to-ground fault signal may be a combination of two signals. In this regard, in some embodiments, the single phase-to-ground fault signal may be received as a representation of a single phase-to-ground fault signal. The representation may be the signal itself or some modification or alteration of the signal. The two signals that may be combined may include a local ground fault signal (or a representation of a local ground fault signal), and a remote ground fault signal (or a representation of the remote ground fault signal). The two signals may be combined using a logical-or operation to generate the single phase-to-ground fault signal.

In this regard, the single phase-to-ground fault signal receiver 440 may be configured to receive the local ground fault signal as a result of the detection of a local single phase-to-ground fault in the zone local to the apparatus 400. As such, the local ground fault signal may indicate the presence of a local single phase-to-ground fault in the local zone. The apparatus 400 may detect the ground fault in the local zone, via the monitoring devices 425, and receive the local ground fault signal internally as a result of an analysis on the information received from the monitoring devices 425. Upon receiving the local ground fault signal, apparatus 400 and processor 405 may be configured to provide for transmission of a local ground fault notification. The local ground fault notification may be transmitted to other protective devices or to the supervisory controller 460 for subsequent transmission to the other protective devices. In this manner, the local ground fault notification may result in other protective devices receiving a remote ground fault signal.

The single phase-to-ground fault signal receiver 440 may also be configured to receive the remote ground fault signal as a result of a detection of a single phase-to-ground fault in a zone that is remote from the apparatus 400. In this regard, a protective device associated with a remote zone may detect a remote single phase-to-ground fault and provide for transmission of the remote ground fault signal. In some exemplary embodiments, the protective device associated with the remote zone may provide for transmission of the single phase-to-ground fault condition to the supervisory controller 460, and the supervisory controller 460 may transmit the remote ground fault signal to the apparatus 400. Further, in some embodiments, reception of the remote ground fault signal may set a remote ground fault flag in, for example, the memory device 410 of apparatus 400. In this regard, the remote ground fault flag may be a representation of the remote ground fault signal. Further, in the event that the remote phase-to-ground fault is cleared, a remote ground fault signal may be received that clears the remote ground fault flag.

As described above, the processor 405 may be configured to combine the local ground fault signal and the remote ground fault signal using a logical-or function to generate the single phase-to-ground fault signal. In this regard, the single phase-to-ground fault signal can indicate to apparatus 400 that a single phase-to-ground fault has occurred and is present on the power system. In embodiments, where the power system is an ungrounded system, the single phase-to-ground fault signal can indicate that the power system is currently in a "ride-through" mode, where a single phase-to-ground fault is present on the system and the fault has not yet been cleared or isolated.

The double phase-to-ground fault signal receiver 445 may be configured to receive a double phase-to-ground fault signal. In this regard, the apparatus 400 may include various means for receiving the double phase-to-ground fault signal, which may include the processor 405, the double phase-to-ground fault signal receiver 445, the communication interface 430, the monitoring and control interface 420, a plurality of electronic components, the user interface 415, algorithms for receiving the double phase-to-ground fault signal described herein and executed by the foregoing or other elements, and/or the like. The double phase-to-ground fault signal may indicate whether a double phase-to-ground fault is present on the power system.

Since a previous single phase-to-ground fault was detected on the system, there is a possibility that a first single phase-to-ground fault has occurred on a first phase at a first location and second single phase-to-ground fault has occurred on a second phase at a second location. As such, exemplary embodiments of the present invention may provide for a delay in order to allow the supervisory controller 460 or the processor 405 to intelligently open protective devices so as to limit or eliminate de-energized loads.

To allow time for the supervisory controller 460 or the processor 405 to intelligently open select switching devices, the timer 450 may be configured to provide for a delay. In this regard, the apparatus 400 may include various means for providing for a delay, which may include the processor 405, the timer 450, algorithms for providing for a delay described herein and executed by the foregoing or other elements, and/or the like. The timer 450 may run while the single phase-to-ground fault signal indicates that single phase-to-ground fault is present on the power system, and the double phase-to-ground fault signal indicates that the double phase-to-ground fault is present on the power system. In the event that the double phase-to-ground fault signal indicates that the double phase-to-ground fault is no longer present on the power system, the timer will cease running and reset. Such changes in these signals would indicate that the faulted zones have been isolated from each other or the faults have been otherwise cleared. As such, the timer may allow for an opportunity to isolate the phase-to-ground fault on the first phase from the phase-to-ground fault on the second phase.

In the absence of a change in the single phase-to-ground fault signal or the double phase-to-ground fault signal, the timer may run until it reaches a predetermined duration. In this regard, the timer may decrement to a threshold value, increment to a threshold value, or the like, to implement a delay for a predetermined duration. The threshold value may be selected so as to protect power system equipment from extended exposure to voltage and/or current stresses resulting from the fault condition. In some exemplary embodiments, the timer threshold value may be reached within approximately 20 cycles. However, other timer thresholds may be utilized. In some exemplary embodiments, the timer threshold may be selected based on the latency of the communications network 435.

In some exemplary embodiments, processor 405 may be configured to receive an isolation signal before the delay expires. The delay may expire when the timer reaches at least a predetermined threshold. In this regard, the apparatus 400 may include various means for receiving the isolation signal, which may include the processor 405, the communication interface 430, one or more electronic components, the user interface 415, algorithms for receiving the isolation signal described herein and executed by the foregoing or other elements, and/or the like. The isolation signal can be received from the supervisory controller 460, the protective device 465 or received internal to the apparatus 400. The supervisory controller 460, or other means, can initiate a switching device trip operation. The supervisory controller 460 may analyze the power system and, based on information provided by various protective devices on the power system, determine a location to open a switching device where maximum load may remain energized. If the identified switching device is within the control of the apparatus 400 (e.g., switching device 470) the processor 405 may receive the isolation signal.

Further, trip signal generator 455 may be configured to provide for transmission of a trip signal. In this regard, the apparatus 400 may include various means for providing for transmission of the trip signal, which may include the processor 405, trip signal generator 455, monitoring and control interface 420, the communication interface 430, one or more electronic components, the user interface 415, algorithms for providing for transmission of the trip signal described herein and executed by the foregoing or other elements, and/or the like. In this regard, the trip signal may be provided in response to receiving the isolation signal. The trip signal may be received by the switching device 470, and may result in the switching device 470 operating to electrically open a point in the power system. In some exemplary embodiments, transmission of the trip signal may be provided for if the local ground fault signal indicates that a local single phase-to-ground fault is present in the zone local to the apparatus 400. Further, in some exemplary embodiments, transmission of the trip signal may be provided for if the single phase-to-ground fault signal indicates that a single phase-to-ground fault is present at any location on the system.

The trip signal generator 455 may also be configured to provide for transmission of a trip signal if the timer reaches the threshold value. In this regard, if the double phase-to-ground fault condition is not responded to by the apparatus 400 or other protective devices, the timer may reach the threshold value. When the timer reaches the threshold value, a trip signal is transmitted to the switching device 470, causing switching device 470 to operate to open a point on the power system.

In various additional embodiments of the present invention, processor 405 may be configured to provide for transmission of a trip signal when a three-phase fault is detected. Further, in situations where no single phase-to-ground fault has been previously detected on the system, the processor 405 may be configured to provide for transmission of a trip signal without the delay of the timer if a phase-to-phase fault or a double phase-to-ground fault is detected.

Figure 5:
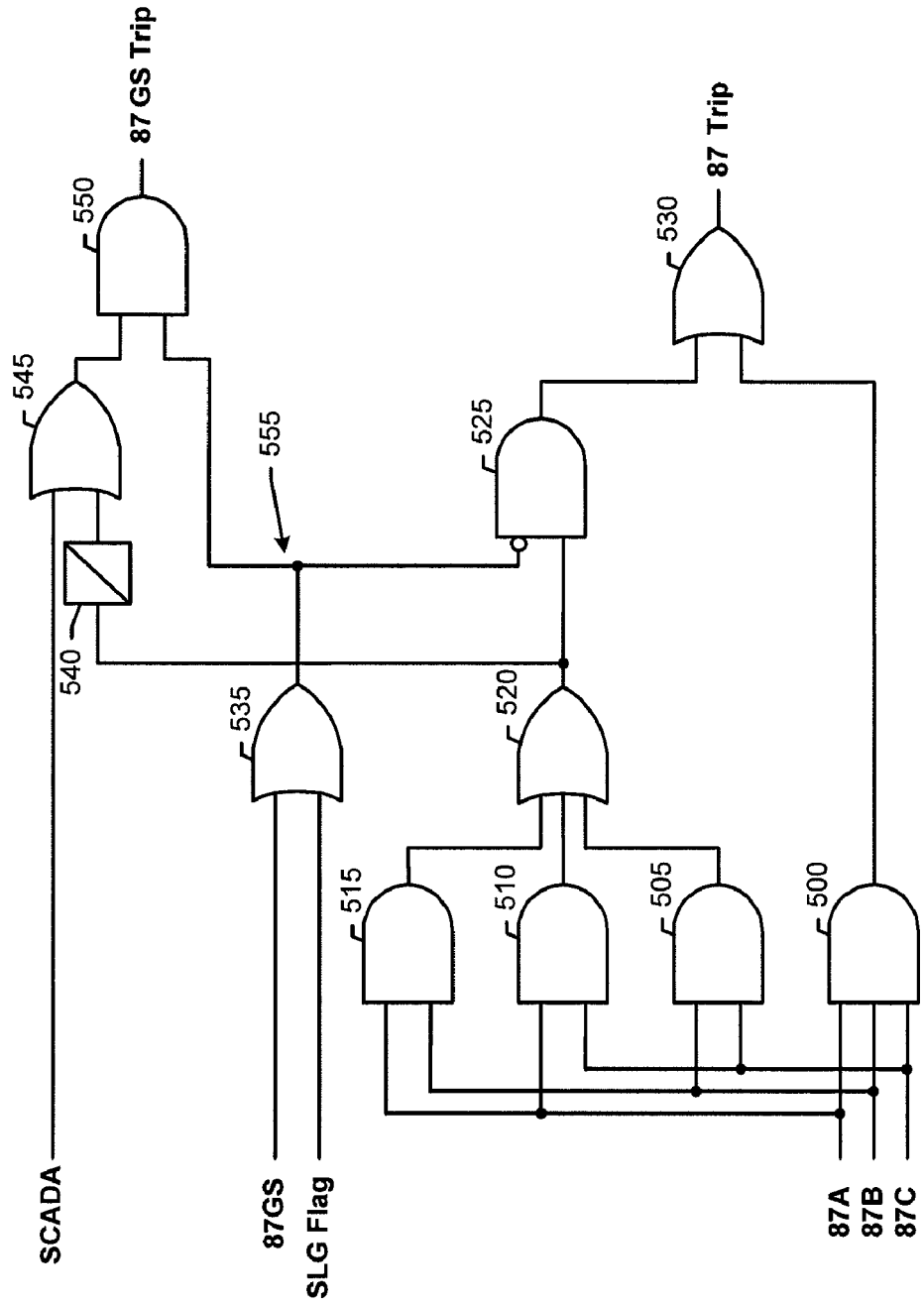
FIG. 5 is a configuration of logic devices for facilitating fault protection according to various exemplary embodiments of the present invention.

FIG. 5 depicts a configuration of a plurality of electronic components for providing fault protection according to various exemplary embodiments of the present invention. The plurality of electronic components in FIG. 5 may be combinational logic components and the inputs and outputs the configuration may be signals as described above. The inputs and outputs may be either logical trues (i.e., logical ones) or logical falses (i.e., logical zeros). In some exemplary embodiments, the logical states may be provided as high and low voltages, or values, such as 1 or 0. Further, in some exemplary embodiments, the configuration of the plurality of electronic components of FIG. 5 may be implemented in conjunction with a conventional protective relay to implement an exemplary embodiment of the present invention.

The input signals 87A, 87B, and 87C may be phase current differential signals. As such, if phase current differentials are detected on a phase, the associated input may be a logical true. If no differential current is detected, the input may be a logical false. In this regard, when a double phase-to-ground fault or a phase-to-phase fault is detected, two of 87A, 87B, or 87C may be logical trues. Similarly, if a three phase fault is detected, all of 87A, 87B, and 87C may be logical trues.

Further, the input signal SLG (Single-Line-to-Ground) Flag may be a representation of the remote ground fault signal as described above. In this regard, SLG Flag may be a logical true when a remote single phase-to-ground fault is currently present on the system, and otherwise SLG Flag may be a logical false. Input signal 87GS may be the local ground fault signal, flag, or other means of indication as describe above. In this regard, when a local single phase-to-ground fault is detected, 87GS may be a logical true, otherwise 87GS may be a logical false. The input signal SCADA may be the isolation signal as described above. In this regard, if a switch opening operation is desired at a switching device controlled by the associated protective device, SCADA may be a logical true, otherwise SCADA may be a logical false. When output signals 87GS Trip and/or 87 Trip are logical true, a trip signal as described above may be generated, resulting in the opening operation of a switching device.

With respect to the operation of the configuration of FIG. 5, when a three phase fault is detected 87A, 87B, and 87C may be logical trues. As such the output of AND gate 500 may be a logical true and accordingly, 87 Trip (i.e., the output or OR gate 530) may be a logical true providing a trip signal. In this regard in some exemplary embodiments, gate 500 and 530 may be removed, and three phase fault conditions may be detected via the 87A, 87B, and 87C inputs to the gates 515, 510, and 505.

Further, when no single phase-to-ground fault is detected anywhere on the system (i.e., 87GS and SLG Flag are logical falses) and a phase-to-phase or a double phase-to-ground fault is detected, two of 87A, 87B, or 87C may be logical trues and the output of the appropriate gate (i.e., AND gate 505, AND gate 510, or AND gate 515) may be a logical true. Since 87GS and SLG Flag are logical falses, the output 555 of OR gate 535 may be a logical false, and the inverted input to AND gate 525 may be a logical true. Since the inputs to AND gate 525 are logical true, 87 Trip may be a logical true and a trip signal may be provided.

However, when a single phase-to-ground fault is detected, either local or remote, 87GS and/or SLG Flag may be a logical true. As such, the output 555 of OR gate 535 may be a logical true, and due to the inverted input on AND gate 525, 87 Trip cannot be a logical true as a result of a phase-to-phase or a double phase-to-ground fault. As such, to generate a trip signal when a single phase-to-ground fault is detected on the system, 87GS Trip may be used.

As such, consider the situation where a local or remote ground fault is detected making 87GS or SLG Flag a logical true, respectively. Note that when either 87GS or SLG Flag is true, a logical true is output from gate 535 (i.e., output 555), and due to the inverter on the input of that AND gate 525, the output of gate 525 cannot become true and no trip signal can be provided through 87 Trip. If a double phase-to-ground fault is then detected, the output to OR gate 520 may be a logical true. Timer 540 may run as long as the output to the OR gate 520 is a logical true. When the timer threshold is reached, the output of OR gate 545 may be a logical true, and since 87GS is a logical true, 87GS Trip (i.e., the output of AND gate 550) may be a logical true. Accordingly, a trip signal may be generated. In this regard, if during the elapsing of the timer 540, SCADA goes to a logical true, 87GS Trip may also become a logical true and trip signal may be generated.

As such, the timer provides for a delay allowing the SCADA signal to determine where on the system a trip signal may be generated. In this regard, if the SCADA signal on another protective device goes to a logical true, a trip signal may be provided elsewhere and the faults may be isolated. In this scenario, the output of OR gate 520 may go to a logical false because a double phase-to-ground fault is no longer on the system. As result the timer may stop and reset.

FIGS. 6 and 8-10 are flowcharts of a system, method, and program product according to exemplary embodiments of the invention. It will be understood that each block, step, or operation of the flowcharts, and combinations of blocks, steps or operations in the flowcharts, can be implemented by various means, such as hardware, firmware, and/or software including one or more computer program code portions, program instructions, or executable program code portions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block (s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions or steps, or combinations of special purpose hardware and computer instructions.

Figure 6:
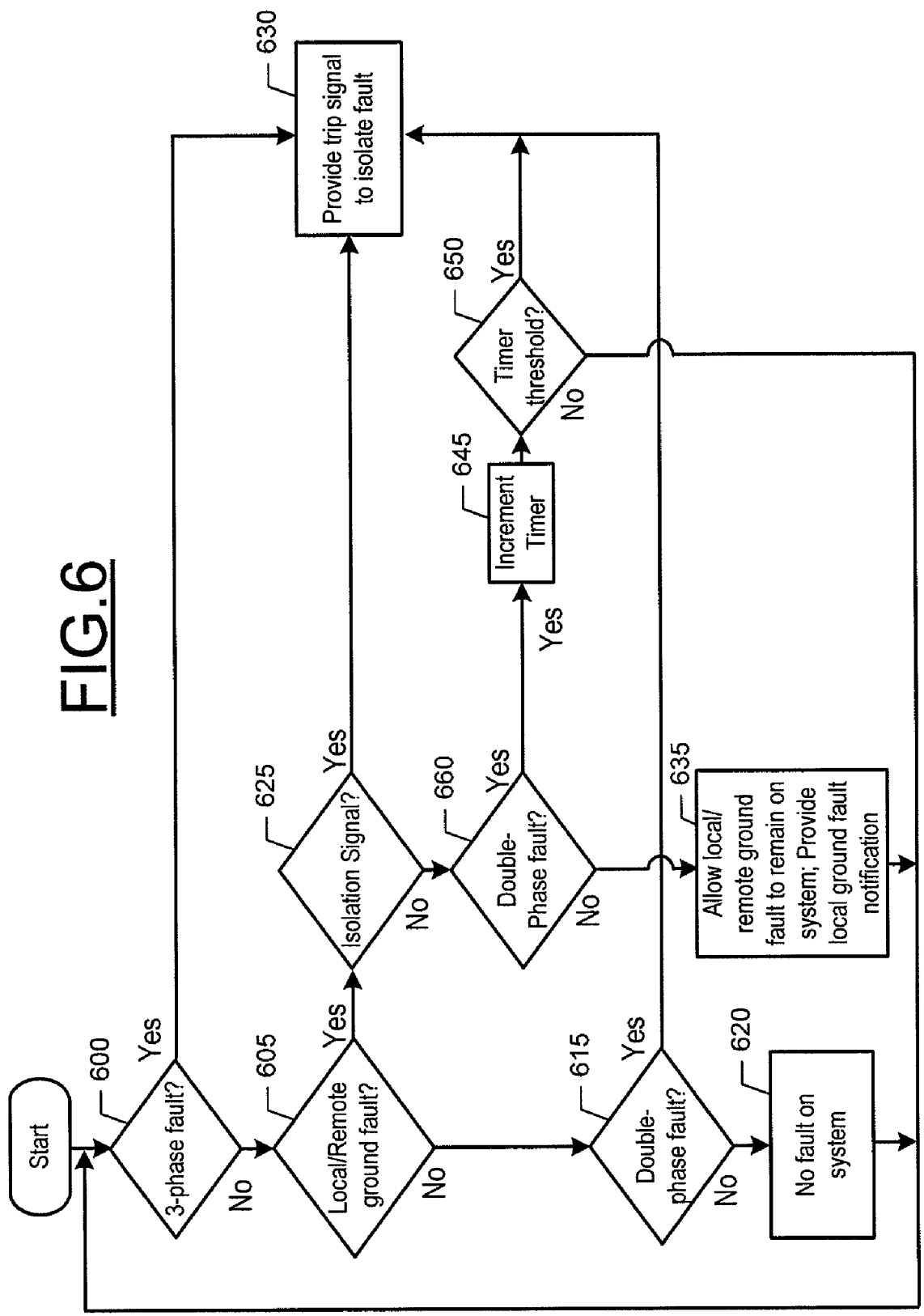
FIG. 6 is a flowchart according to an exemplary method for fault protection according to various exemplary embodiments of the present invention.

In this regard, one exemplary embodiment of a method for providing fault protection is illustrated in FIG. 6. At 600, a determination may be made regarding whether a three phase fault is present on the system. If a three phase fault is detected, a trip signal can be provided to isolate the fault at 630. In some embodiments, the three phase fault determination at 600 may be removed from the method of FIG. 6.

A determination may be made regarding whether a local or remote ground fault is present on the system at 605. If a local or remote ground fault is detected, a determination may be made regarding whether an isolation signal has been received at 625. If an isolation signal has been received, a trip signal can be provided to isolate the fault at 630. If no isolation signal is received, a determination may be made regarding whether a double phase fault (i.e., a phase-to-phase or a double phase-to-ground fault) is present on the system at 660. If no double phase fault is detected, the local or remote ground fault may remain on the system at 635 and, in some exemplary embodiments, a local ground fault notification can be provided. If a double phase fault is detected, a timer can be incremented (or decremented in various embodiments) at 645 providing an opportunity to receive an isolation signal (i.e., SCADA signal from FIG. 5), and a determination may be made regarding whether the timer threshold has been reached at 650. If the timer threshold has been reached, a trip signal can be provided to isolate the fault at 630. If the timer threshold has not been reached the method may begin anew at 600, but with an incremented timer value.

If no local or remote ground fault is detected, a determination may be made regarding whether a double phase fault is present on the system at 615. If a double phase fault is detected, a trip signal can be provided to isolate the fault at 630. If no double phase fault is detected, then no fault is present on the system at 620, and the method may begin anew at 600.

Figure 7A:
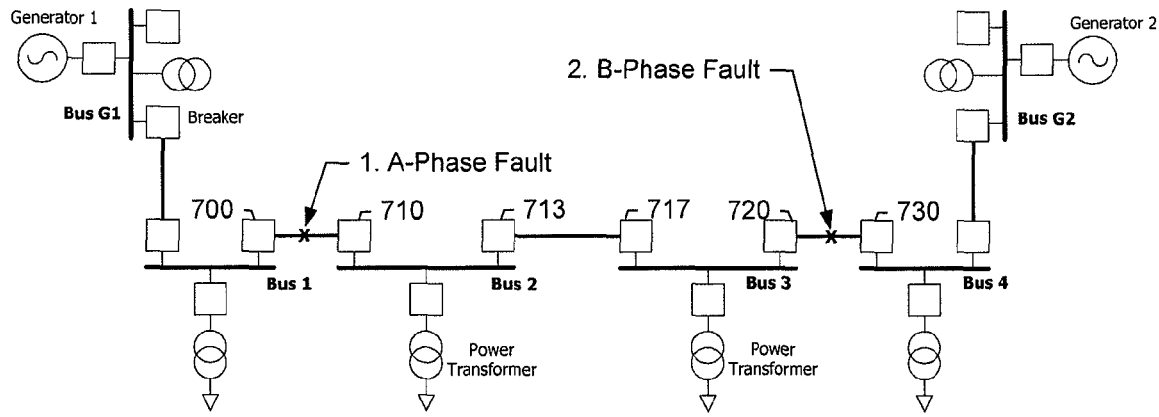
FIG. 7a illustrates a radial multi-source configuration of an ungrounded power system experiencing a double phase-to-ground fault according to various exemplary embodiments of the present invention.
Figure 7B:
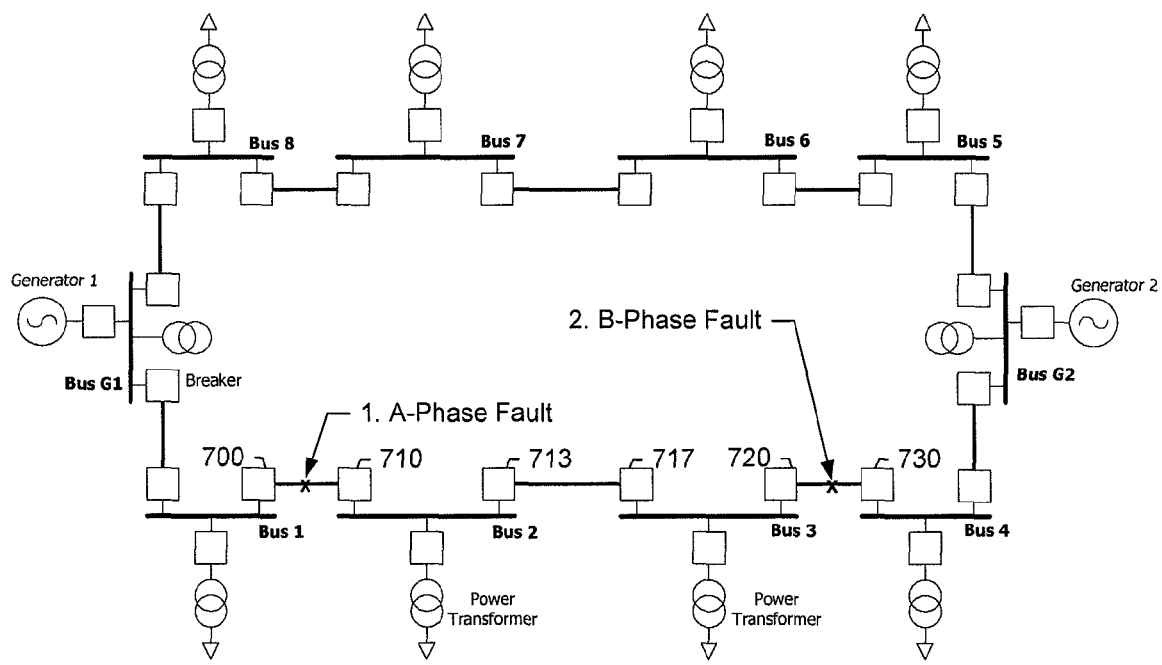
FIG. 7b illustrates a ring bus configuration of an ungrounded power system experiencing a double phase-to-ground fault according to various exemplary embodiments of the present invention.

The operation of various embodiments of the present invention will now be described with respect to the exemplary power systems depicted in FIGS. 7a and 7b. The exemplary power systems may be three-phase, ungrounded systems. FIG. 7a depicts a multi-source radial system, while FIG. 7b depicts a multi-source ring bus configuration. Each breaker (depicted as square boxes) may be associated with a protective device configured in accordance with various embodiments of the present invention.

In both of the systems a first single phase-to-ground fault may occur on A phase between Bus 1 and Bus 2. As a result, a local ground fault signal may be received by the protective devices associated with breakers 700 and 710. The protective devices associated with breakers 700 and 710 may provide a local ground fault notification, which may result in the transmission of a remote ground fault signal to all other protective devices on the power system.

Subsequently, a second single phase-to-ground fault may occur on B phase between Bus 3 and Bus 4. Accordingly, the various protective devices on the system may detect a double phase-to-ground fault and a double phase-to-ground fault signal may be provided to the protective devices on the system. As a result, a local ground fault signal may also be received by the protective devices associated with breakers 720 and 730. Since the local or remote ground fault signal may be provided to the protective devices associated with breakers 700, 710, 713, 717, 720, and 730, a supervisory controller may transmit an isolation signal to 710, 713, 717, and/or 720 protective devices to isolate the faults in the radial configuration. In the ring bus configuration a supervisory controller may transmit an isolation signal to 700 and 710 or 720 and 730 protective devices to isolate the faults. Further, since a double phase-to-ground fault was detected subsequent to a single phase-to-ground fault, timers in each of the protective devices on the system may be running. In these scenarios, a determination may be made to open the appropriate breaker(s) before the timers reach the threshold value. Opening the appropriate breaker(s) may isolate the faults and clear the double phase-to-ground fault condition without dropping load. Opening the appropriate breakers will also cause the double phase-to-ground fault signals to no longer indicate that a double phase-to-ground fault is on the system. As a result, the timers may stop running. If no isolation signal is provided to an appropriate protective device, the timers may reach the threshold values causing, for example, breakers 700 and 730 to open. As a result, the power transformers associated with bus 2 and bus 3 may be de-energized. Under certain circumstances in the ring-bus configuration, when the timers reach the threshold value, breakers on, for example, bus G1, G2 or other breakers may be opened, causing generator 1 or generator 2 to go offline.

Figure 8:
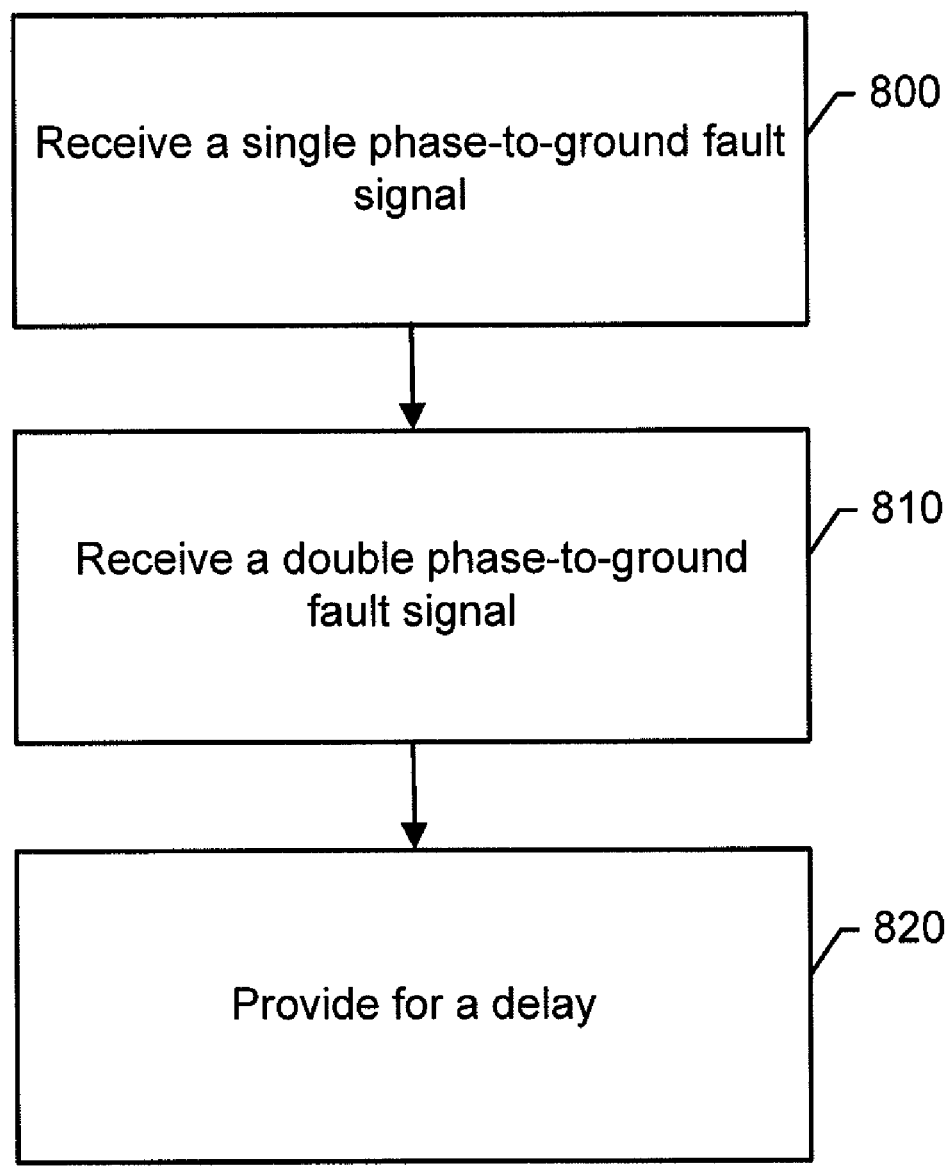
FIGS. 8, 9, and 10 are flowcharts according to exemplary methods for fault protection according to various exemplary embodiments of the present invention.

FIG. 8 depicts another exemplary embodiment of a method for fault protection according to various exemplary embodiments of the present invention. The exemplary method may include receiving a single phase-to-ground fault signal at 800. In this regard, the single phase-to-ground fault signal may indicate whether a first phase-to-ground fault is present on a first phase of an ungrounded power system. Further, as used herein the term "single" as in "single phase-to-ground fault signal" modifies the type of fault, and as such, multiple signals (i.e., multiple single phase-to-ground fault signals) may be received that are indicative of a single phase-to-ground fault. The exemplary method may also include receiving a double phase-to-ground fault signal subsequent to receiving the single phase-to-ground fault signal at 810. In this regard, the double phase-to-ground fault signal may indicate that a double phase-to-ground fault is present on the ungrounded power system due to the first phase-to-ground fault on the first phase and a second phase-to-ground fault on a second phase. The exemplary method may further include providing for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system at 820. The delay may allow for an opportunity to isolate the phase-to-ground fault on the first phase from the phase-to-ground fault on the second phase prior to expiration of the delay. Additionally, the exemplary method may include providing for transmission of a trip signal prior to the delay expiring. In some exemplary embodiments, the predetermined duration may be implemented by setting a timer threshold value.

Figure 9:
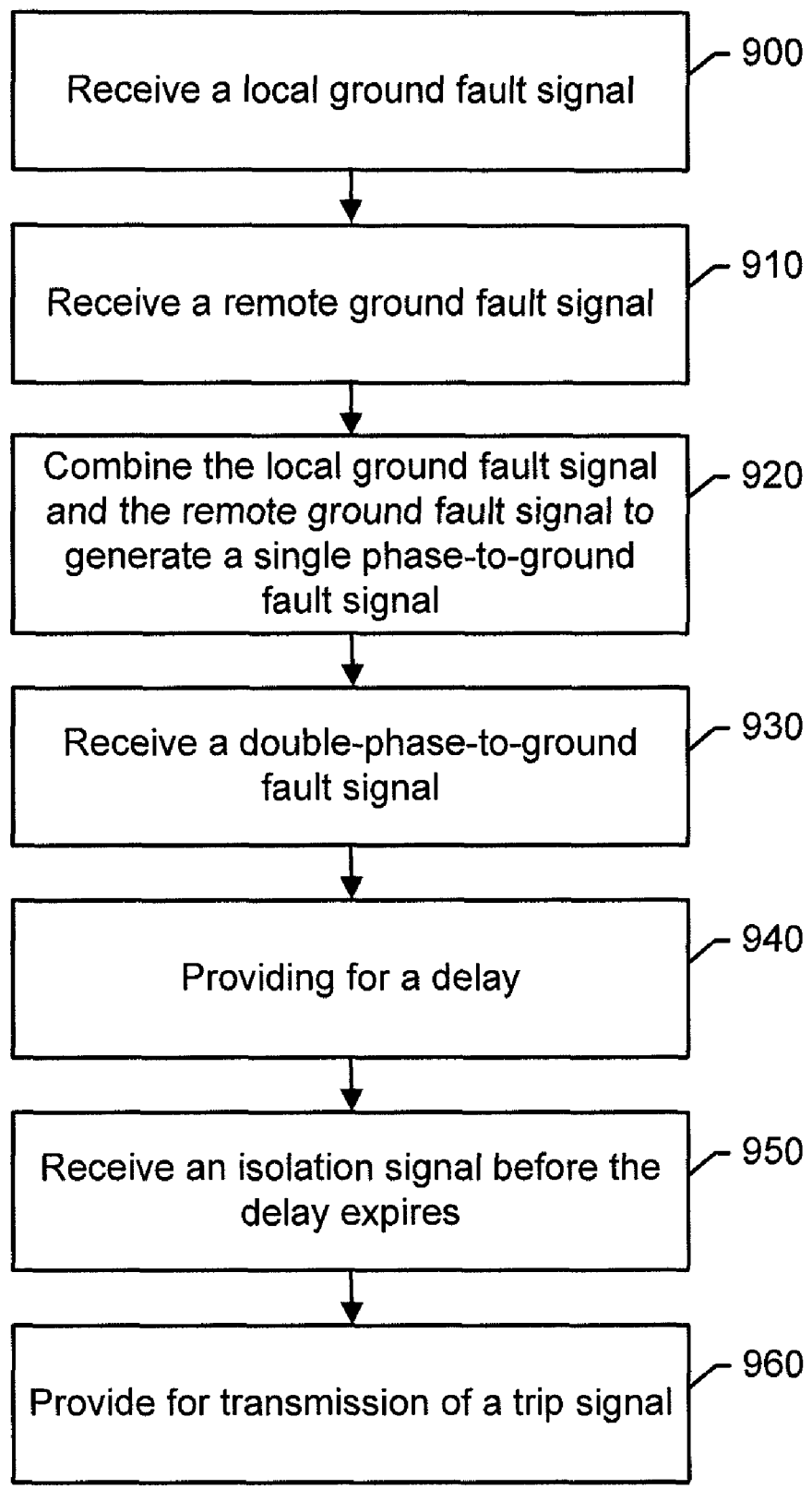

FIG. 9 depicts an additional exemplary embodiment of a method for fault protection according to various exemplary embodiments of the present invention. The exemplary method may include receiving a local ground fault signal at 900. The local ground fault signal may indicate whether a local single phase-to-ground fault is present in a local zone of the ungrounded power system. In some embodiments, the exemplary method may further include providing for transmission of a local ground fault notification upon receiving the local ground fault signal indicating that the single phase-to-ground fault is present in the local zone of the ungrounded power system. The transmission of the local ground fault notification may cause the transmission of remote ground fault signals. In some embodiments, receiving the local ground fault signal may include setting a local ground fault flag.

The exemplary method may also include receiving a remote ground fault signal at 910. The remote ground fault signal may indicate whether a remote single phase-to-ground fault is present in a remote zone of the ungrounded power system. In some embodiments, receiving the remote ground fault signal may include setting a remote ground fault flag. The remote ground fault flag may be the representation of the remote ground fault signal. Further, the exemplary method may include combining a representation of the local ground fault signal and a representation of the remote ground fault signal at 920 using a logical-or function to generate a single phase-to-ground fault signal.

In various embodiments, the exemplary method may also include receiving a double phase-to-ground fault signal subsequent to receiving the single phase-to-ground fault signal at 930. In this regard, the double phase-to-ground fault signal may indicate that a double phase-to-ground fault is present on the ungrounded power system due to a first phase-to-ground fault on a first phase and a second phase-to-ground fault on a second phase. The method may further include providing for a delay of a predetermined threshold while the single phase-to-ground fault signal indicates that the single phase-to-ground fault is present on the ungrounded power system and the double phase-to-ground fault signal indicates that the double phase-to-ground fault is present on the ungrounded power system at 940. The delay may allow for an opportunity to isolate the phase-to-ground fault on the first phase from the phase-to-ground fault on the second phase prior to expiration of the delay.

In some embodiments, the exemplary method may further include receiving an isolation signal prior to expiration of the delay at 950, and providing for transmission of the trip signal in response to receiving the isolation signal if the local ground fault signal indicates the local single phase-to-ground fault is present in the local zone of the ungrounded system at 960. In some exemplary embodiments, the predetermined duration may be implemented by setting a timer threshold value. Further, in some embodiments, the isolation signal may be received from a SCADA system.

Figure 10:
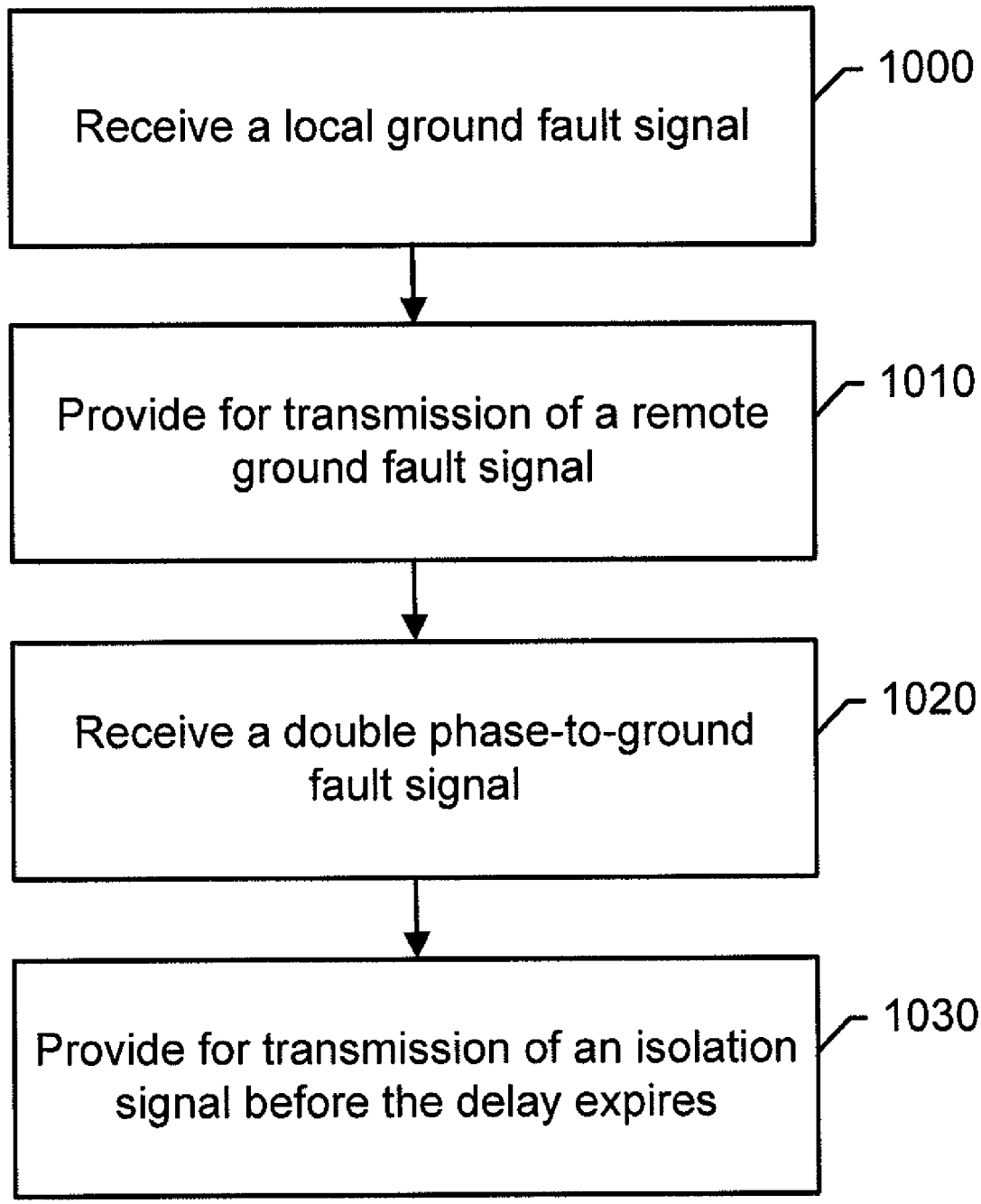

Additionally, FIG. 10 depicts an additional exemplary method for fault protection according to various exemplary embodiments of the present invention. The exemplary method may include receiving a local ground fault signal at 1000, and providing for transmission of a remote ground fault signal at 1010. At 1020, the exemplary method may include receiving a double phase-to-ground fault signal, and at 1030, the method may include providing for transmission of an isolation signal prior to expiration of a delay.

Many modifications and other exemplary embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving a single phase-to-ground fault signal, the single phase-to-ground fault signal indicating that a first phase-to-ground fault is present on a first phase of an ungrounded power system;
receiving a double phase-to-ground fault signal subsequent to receiving the single phase-to-ground fault signal, the double phase-to-ground fault signal indicating that a double phase-to-ground fault is present on the ungrounded power system due to the first phase-to-ground fault on the first phase and a second phase-to-ground fault on a second phase; and
providing for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system, thereby allowing for an opportunity to isolate the phase-to-ground fault on the first phase from the phase-to-ground fault on the second phase prior to expiration of the delay.

2. The method of claim 1, wherein receiving the single phase-to-ground fault signal includes:
   receiving a local ground fault signal, the local ground fault signal indicating whether a local single phase-to-ground fault is present in a local zone of the ungrounded power system;
   receiving a remote ground fault signal, the remote ground fault signal indicating whether a remote single phase-to-ground fault is present in a remote zone of the ungrounded power system; and
   combining a representation of the local ground fault signal and a representation of the remote ground fault signal using a logical-or function to generate the single phase-to-ground fault signal.

3. The method of claim 2 further comprising:
   receiving an isolation signal before the delay expires; and
   providing for transmission of the trip signal in response to receiving the isolation signal.

4. The method of claim 2, wherein receiving the remote ground fault signal includes setting a remote ground fault flag, the remote ground fault flag being the representation of the remote ground fault signal.

5. The method of claim 2 further comprising providing for transmission of a local ground fault notification upon receiving the local ground fault signal indicating that the single phase-to-ground fault is present in the local zone of the ungrounded power system, transmission of the local ground fault notification causing the transmission of remote ground fault signals.

6. The method of claim 1 further comprising:
   receiving an isolation signal before the delay expires; and
   providing for transmission of the trip signal in response to receiving the isolation signal.

7. The method of claim 6, wherein receiving the isolation signal includes receiving the isolation signal from a Supervisory Control And Data Acquisition (SCADA) system.

8. An apparatus comprising one or more electronic components, the one or more electronic components configured to:
   receive a single phase-to-ground fault signal, the single phase-to-ground fault signal indicating that a first phase-to-ground fault is present on a first phase of an ungrounded power system;
   receive a double phase-to-ground fault signal subsequent to receiving the single phase-to-ground fault signal, the double phase-to-ground fault signal indicating that a double phase-to-ground fault is present on the ungrounded power system due to the first phase-to-ground fault on the first phase and a second phase-to-ground fault on a second phase; and
   provide for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system, thereby allowing for an opportunity to isolate the phase-to-ground fault on the first phase from the phase-to-ground fault on the second phase prior to expiration of the delay.

9. The apparatus of claim 8, wherein the one or more electronic components being configured to receive the single phase-to-ground fault signal include being configured to:
   receive a local ground fault signal, the local ground fault signal indicating whether a local single phase-to-ground fault is present in a local zone of the ungrounded power system;
   receive a remote ground fault signal, the remote ground fault signal indicating whether a remote single phase-to-ground fault is present in a remote zone of the ungrounded power system; and
   combine a representation of the local ground fault signal and a representation of the remote ground fault signal using a logical-or function to generate the single phase-to-ground fault signal.

10. The apparatus of claim 9, wherein the one or more electronic components are further configured to:
    receive an isolation signal before the delay expires; and
    provide for transmission of the trip signal.

11. The apparatus of claim 9, wherein the one or more electronic components configured to receive the remote ground fault signal include being configured to set a remote ground fault flag, the remote ground fault flag being the representation of the remote ground fault signal.

12. The apparatus of claim 9, wherein the one or more electronic components are further configured to provide for transmission of a local ground fault notification upon receiving the local ground fault signal indicating that the single phase-to-ground fault is present in the local zone of the ungrounded power system, transmission of the local ground fault notification causing the transmission of remote ground fault signals.

13. The apparatus of claim 8, wherein the one or more electronic components are further configured to:
    receive an isolation signal before the delay expires; and
    provide for transmission of the trip signal in response to receiving the isolation signal.

14. The apparatus of claim 13, wherein the one or more electronic components configured to receive the isolation signal include being configured to receive the isolation signal from a Supervisory Control And Data Acquisition (SCADA) system.

15. A computer program product comprising at least one non-transitory computer-readable storage medium having executable computer-readable program code portions stored therein, the computer-readable program code portions comprising:
    a first program code portion configured to receive a single phase-to-ground fault signal, the single phase-to-ground fault signal indicating that a first phase-to-ground fault is present on a first phase of an ungrounded power system;
    a second program code portion configured to receive a double phase-to-ground fault signal subsequent to receiving the single phase-to-ground fault signal, the double phase-to-ground fault signal indicating that a double phase-to-ground fault is present on the ungrounded power system due to the first phase-to-ground fault on the first phase and a second phase-to-ground fault on a second phase; and
    a third program code portion configured to provide for a delay of a predetermined duration while the single phase-to-ground fault signal indicates that the single phase-to-ground fault is present on the ungrounded power system and the double phase-to-ground fault signal indicates that the double phase-to-ground fault is present on the ungrounded power system, thereby allowing for an opportunity to isolate the phase-to-ground fault on the first phase from the phase-to-ground fault on the second phase prior to expiration of the delay.

16. The computer program product of claim 15, wherein the first program code portion configured to receive the single phase-to-ground fault signal includes being configured to:
   receive a local ground fault signal, the local ground fault signal indicating whether a local single phase-to-ground fault is present in a local zone of the ungrounded power system;
   receive a remote ground fault signal, the remote ground fault signal indicating whether a remote single phase-to-ground fault is present in a remote zone of the ungrounded power system; and
   combine a representation of the local ground fault signal and a representation of the remote ground fault signal using a logical-or function to generate the single phase-to-ground fault signal.

17. The computer program product of claim 16, wherein the computer-readable program code portions further comprise:
   a fourth program code portion configured to receive an isolation signal before the delay expires; and
   a fifth program code portion configured to provide for transmission of the trip signal in response to receiving the isolation signal.

18. The computer program product of claim 16, wherein the first program code portion configured to receive the remote ground fault signal includes being configured to set a remote ground fault flag, the remote ground fault flag being the representation of the remote ground fault signal.

19. The computer program product of claim 16, wherein the computer-readable program code portions further comprise a fourth program code portion configured to provide for transmission of a local ground fault notification upon receiving the local ground fault signal indicating that the single phase-to-ground fault is present in the local zone of the ungrounded power system, transmission of the local ground fault notification causing the transmission of remote ground fault signals.

20. The computer program product of claim 15, wherein the computer-readable program code portions further comprise:
   a fourth program code portion configured to receive an isolation signal before the delay expires; and
   a fifth program code portion configured to provide for transmission of the trip signal in response to receiving the isolation signal.

* * * * *